(12) United States Patent
DiPietro

(10) Patent No.: US 8,793,588 B2
(45) Date of Patent: Jul. 29, 2014

(54) PERSONALIZED KIOSK

(75) Inventor: Phil DiPietro, Johns Creek, GA (US)

(73) Assignee: NCR Corporation, Duluth, GA (US)

( * ) Notice: Subject to any disclaimer, the term of this patent is extended or adjusted under 35 U.S.C. 154(b) by 224 days.

(21) Appl. No.: 12/846,542

(22) Filed: Jul. 29, 2010

(65) Prior Publication Data

US 2012/0030583 A1    Feb. 2, 2012

(51) Int. Cl.
*G06F 3/01* (2006.01)
*G06F 3/048* (2013.01)

(52) U.S. Cl.
USPC .......... 715/745; 715/210; 705/27.1; 705/26.7

(58) Field of Classification Search
USPC .......................................... 715/745, 744, 747
See application file for complete search history.

(56) References Cited

U.S. PATENT DOCUMENTS

| | | | |
|---|---|---|---|
| 6,646,659 B1 * | 11/2003 | Brown et al. ................. | 715/811 |
| 7,978,618 B2 * | 7/2011 | Richardson et al. .......... | 370/252 |
| 8,204,892 B2 | 6/2012 | Balebail | |
| 2003/0090515 A1 * | 5/2003 | Chang et al. .................. | 345/745 |
| 2005/0044508 A1 * | 2/2005 | Stockton ....................... | 715/811 |
| 2005/0086123 A1 * | 4/2005 | White, Jr. ........................ | 705/26 |
| 2007/0288609 A1 * | 12/2007 | Sundaresan ................... | 709/220 |
| 2008/0249837 A1 * | 10/2008 | Angell et al. ................... | 705/10 |
| 2009/0265247 A1 * | 10/2009 | Carroll et al. .................. | 705/15 |
| 2009/0319462 A1 * | 12/2009 | Tirpak et al. .................. | 706/47 |
| 2010/0121807 A1 * | 5/2010 | Perrier et al. .................. | 706/47 |
| 2010/0169186 A1 * | 7/2010 | Sakaguchi et al. ............. | 705/27 |

* cited by examiner

*Primary Examiner* — William Bashore
*Assistant Examiner* — Jeanette J Parker
(74) *Attorney, Agent, or Firm* — Harden E. Stevens, III

(57) ABSTRACT

A method is provided for personalized touch-based computing devices for individual users. A user would provide identification data to a touch-based computing device. The touch-based computing device, or ordering system that supports the touch-based computing device, identifies the user from the identification data and retrieves user interface format data from a database. User interface data is retrieved and transmitted to the touch-based computing device. A user interface is displayed to the user in a format based on the user interface format data. The format of the user interface and the order of items displayed in the user interface are controlled by the user interface format data. Transaction data from the user is stored in a database and the transaction data may also be used to improve how the data is displayed for future visits.

19 Claims, 3 Drawing Sheets

PERSONALIZED KIOSK

FIELD OF THE INVENTION

The present invention relates, generally, to touch-based computing devices, such as kiosks.

BACKGROUND

Businesses, such as a fast food restaurant, may attempt to continually improve the experience of customers within the business. For example, the business might try to improve such customer tasks as order placement or check out. By improving these tasks, consumers may also increase their transaction total resulting in increased overall revenue for the establishment. As a result, methods to improve the ordering and check out processes for customers are very important.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

Techniques are provided to personalize a touch-based computing device, such as a kiosk, to a user. In self serve touch-based computing devices, such as a self-serve kiosk, a graphical user interface may be customized to a particular consumer after the consumer has been properly identified by the touch-based computing device. For touch-based computing devices used by a particular employee of the establishment, the graphical user interface of the touch-based computing device may be customized specifically for the particular employee.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
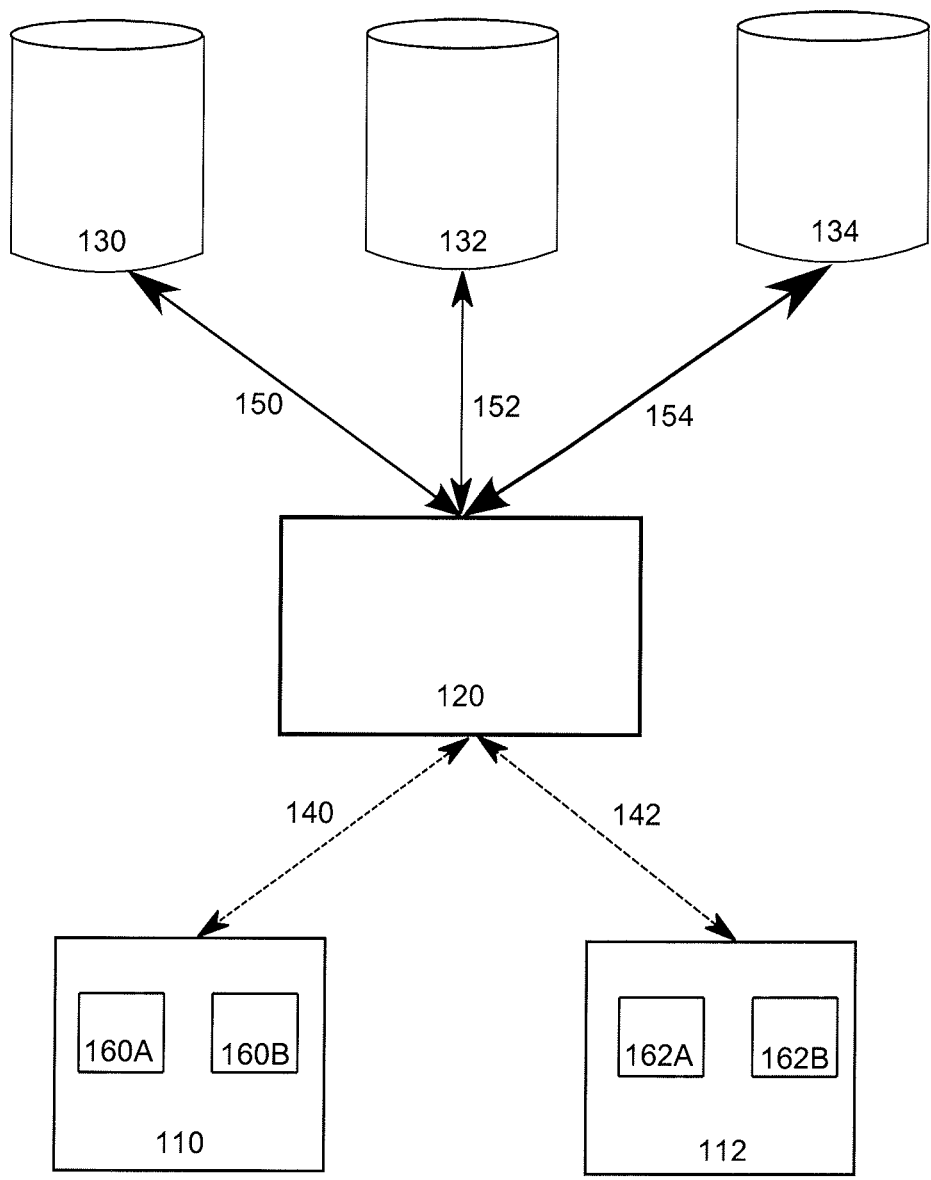
FIG. 1 is a block illustration of a system for providing personalized touch-based computing devices, according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Methods and techniques are described to individualize a graphical user interface of a touch-based computing device, such as a kiosk, for a particular user. In an embodiment, a provider (e.g., restaurants, retailers, etc.) may provide touch-based computing devices that allow customers to input ordering data and view transaction data in order to increase the speed of checkout. For example, a plurality of self-service kiosks might be employed by the provider with a single attendant supervising the plurality of self-service kiosks. The plurality of self-service touch-based computing devices allows for quicker ordering and a shorter queue time for the experienced consumer. With the plurality of self-service touch-based computing devices, the experienced user may have a shorter wait for inexperienced consumers or consumers with long orders to enter an order.

Consumers often exhibit repeat buying patterns when eating at a familiar restaurant (e.g., fast-food restaurants) or shopping at a familiar retailer (e.g., grocery store, big box retailer, etc.). In an embodiment, a touch-based computing device or ordering system identifies a particular user and modifies the user interface based upon preferences or previous transactions made by the user. By employing a personalized interface for a particular user, repeat actions may be significantly reduced, saving time and frustration. In an embodiment, items from a menu may be displayed to the user in a particular order tailored to buying patterns based upon transaction data of transactions previously performed by the user. In another embodiment, different items on the menu may be offered to the user to encourage more purchases based upon previous transaction data of the user. In an embodiment, graphical user interface modifications may also be made to employee-controlled touch-based computing devices, such as kiosks, to improve data entry by the sales clerk.

Identifying a User

Providers (e.g. restaurants, retailers, etc.) seek to decrease the transaction time of each transaction and increase the amount purchased per transaction. In the fast-food setting, installing and maintaining self-service touch-based computing devices, such as kiosks, may help to achieve those goals. In the case where a plurality of self-service touch-based computing devices may be administered by a single employee, order entry time should decrease as more transactions are able to be performed by a plurality of customers in the same amount of time. In an embodiment, the user interface displayed on a touch-based computing device is personalized based upon the particular user. The user may feel more comfortable with ordering, further increasing the average speed per transaction. In an embodiment, the order that menu items appear to the user would also vary based upon previous transaction data of the particular user. The transaction data may be mined by attempting to decipher buying patterns of the particular user. Transaction data may also be used by determining which items are often ordered with other specific items from an aggregate of users. In an embodiment, transaction data may be limited by considering transaction data only from the particular user. Transaction data may be considered in aggregate with the particular user and a subset of other users. A particular user may also select a preference that all of the particular user's transactions are to remain private. Under this circumstance, transaction data of an aggregate of users might be considered but the particular user's transaction data is not used in any way to personalize the user interface.

In an embodiment, a user may be identified based upon a token. The token may take multiple forms. For example, the token may be an RFID attached to a customer loyalty card or a near field communication (NFC) tag in a mobile device. An antenna from the ordering system would receive the signal transmitted by the token to help identify the user. The signal may contain an identification number or identification data that enables the ordering system to identify the user to the system.

In an embodiment, a user may scan or swipe an identification card for identification of the user to the ordering system. For example, a loyalty card might have a bar code that is able to scanned via an optic scanner. In another example, the loyalty card has a magnetic strip that might be swiped on a terminal in order for information to be read from the loyalty card. Data on the identification card is used to identify the user to the ordering system.

In an embodiment, the user may self-identify based on entering a username or other type of identifier. For example, prior to ordering, the user may enter a username or other identification data (e.g., telephone number, etc.) in order for the user to identify himself to the ordering system. In an embodiment, cameras may be used to identify users by an optical or biometric scan. Any other type of method upon which identifying an individual may be used to perform identification.

In an embodiment, user identification may occur either locally at the touch-based computing device or remotely through a server. The touch-based computing device may store user identification data locally so that the user may be quickly identified once the identification data is received. The touch-based computing device may also send the user identification data to a server to identify the user if the touch-based computing device does not store any identification data or the user is not readily identified by the local touch-based computing device (that may occur where a customer has ordered at other locations of the franchise but not at the location that the user currently is).

Providing a Personalized User Interface

In an embodiment, once a user has been identified, the touch-based computing device displays a graphical user interface to the user. The user performs transactions on the touch-based computing device via the graphical user interface. The graphical user interface may vary based upon preferences submitted by the user. For example, for a left-handed user, the menu might be a reversed mirror image of the standard graphical user interface. Under this circumstance, keys to select that normally appear on the left side would appear on the right side and other keys that appear on the right side would appear on the left side and so on. If a list of items ordered originally appeared on the left side, the list of items would appear on the right side. In another example, the font size may be adjusted for people who have difficulty reading smaller text. In another example, audio might be added for people with a visual impairment. In another embodiment, colors may be adjusted based upon user preference. In another embodiment, language may be changed based upon user preference.

In an embodiment, a primary central database is accessed in order retrieve the user interface formatting data for the particular user. When the user is identified, the identification data is sent to a central database from an individual touch-based computing device via a network. Based upon the identification data, the central database transmits user interface formatting data to the individual touch-based computing device that made the request and the graphical user interface is formatted based upon the user interface formatting data received.

In an embodiment, a database is kept at each provider's particular location. Under this circumstance, each particular store location is able to maintain a database about customers that have previously visited the particular store location. The database may be smaller in size and very fast to access, but may also present higher overhead to the individual store or franchise owner as each database is individually maintained. In an embodiment, user and transactional data may still be uploaded to a central database so that the user and transactional data may be aggregated with data obtained from other locations. In an embodiment, transactional data may be segregated from user interface format data. Thus, when a user is identified at a location that does not contain self-service touch-based computing devices for ordering, the transactional data produced when ordering with an employee may still be used to improve the ordering process and to propose items to the user when the user does visit a store with self-service touch-based computing devices.

In an embodiment, regional databases are used to provide graphical user interface format data. Using regionalized databases reduces the need for individual store or franchise owners from having to maintain their own databases, without taxing a central database. A regionalized database may be separated based upon the geographic area served. For example, the Pacific region might encompass the states that are along the West Coast of the United States. The southeast region may cover only the area around the southeastern United States. The total geographic area covered by a regional database may vary based upon balancing the number of transactions to each regional database. Thus, one regional database may cover a geographic area that is twice the size of another geographic area, but deal with approximately the same number of transactions per month (e.g. due to the first regional database covering a much denser population than the second regional database). Such a system is illustrated in FIG. 1. In FIG. 1, store 110 comprises touch-based computing devices 160A and 160B and is located in California. Store 112 comprises touch-based computing devices 162A and 162B and is located in Georgia. Database 130 stores user interface format data for the Pacific region. Database 132 stores user interface format data for the southeast region. Database 134 stores user interface format data for the northeast region. Requests from store 110 are made to database server 120 through network 140. The request from store 110 is then routed to database 130 via network 150 as database 130 stores data from the Pacific region and the store is located in California. Requests from store 112 are made to database server 120 through network 142. The request from store 112 is then routed to database 132 via network 152 as database 132 stores data from the southeast region and the store is located in Georgia. For stores located in the northeast region, requests would be routed though network 154 from database server 120.

In an embodiment, the central database is accessed if the user has not visited the particular store previously but has visited other stores within the same chain. Thus a personalized user interface is still available for the user at any location of the chain as long as the user has previously visited other locations of the chain. In addition, overhead of accessing a central or regionalized database is avoided by having data for users at the store or franchise available on-site.

In an embodiment, active users who frequent many different stores may have user interface format data pushed from a central or regional server to the individual stores or franchise locations. This allows users who travel frequently and visit the same chain to have the same personalized graphical user interface data at each location visited. As the data is pushed from the central or regional server, each individual location does not need to request the data from the central or regional server.

Providing Tailored Menu Items

In an embodiment, a server adjusts the display of menu items to the user. Often, a user exhibits similar buying patterns from one transaction to the following transaction. For example, a user might order the same type of hamburger, a medium sized french fries and a large drink every single time the user visits a particular fast food restaurant chain. Transaction data for that order would be linked to that particular user and stored in a database. When the particular user is identified, the user may be offered a hamburger, a medium sized french fries, and a large drink on the first menu screen instead of having to order a hamburger on the screen offering hamburgers, change screens to get to the screen offering fries and order a small fries, and finally ordering a small drink after navigating to the drink screen.

By presenting frequently purchased items first, transaction speed is increased helping both the consumer and the restaurant. Placing items frequently ordered in a prominent part of the screen or on the first screen that may appear to a user increases the likelihood that a user would order that item. Also, by placing correlated items on the same screen (e.g. hamburgers and fries) may increase the likelihood that the user would order the correlated items. Correlated items may not be apparent initially. For example, a particular user may order a pretzel and a milkshake. Though these items may not appear to be related, these items may often be ordered in a pair by a particular user. By placing these two items prominently and quickly on the user interface, the business increases the likelihood that the user orders these two items together. Other items that may be related to the items on the initial screen may also be included with the hope that the user may order additional items. For example, dessert items such like a slice of apple pie might be included with dinner items or cold drinks might be offered with orders for fries.

In an embodiment, promotions and incentives might also be implemented with the customized menu in order to encourage the user to order new or different items. For example, the user who often orders a burger, fries, and drink may never order dessert items. A business might include a promotion or incentive such as a lower price in order to encourage the customer to try an item he or she normally does not order. The promotion or incentive may be integrated and appear in the particular user's customized menu.

In an embodiment, a minimum amount of transaction data may be required prior to the transaction data being used to customize a menu for a particular user. For example, the business may require that the user visit the store at least two previous times in order to have adequate information to present preferred menu items. The amount of data or number of visits may vary from implementation to implementation.

In an embodiment, transaction data based on other characteristics may be used in order to present a more customized menu. For example, if there are children that are identified, children's meals may be offered in one of the initial menu screens. Items may be offered based on the age of the user or any other identifiable characteristic that may help in offered tailored menu items.

In an embodiment, a menu may also be tailored based on the geography of the store or any other factor that may affect ordering. For example, milkshakes or cold drinks might be more prominent when the weather is especially warm. Warm drinks and coffee might by more prominent when the weather is cold. Items might also be tailored based upon whether the setting of the store is more rural or more urban. Any type of characteristic of geography or setting may be used to better tailor the items presented on a user interface to a user.

In an embodiment, when a user enters an order, the transaction data from the order is transmitted to the server for storage. The transaction data may be linked to the particular user. The transaction data may be used when determining which items are to be displayed and when those items are displayed on the user interface. The transaction data may be aggregated with transaction of other users in order to find additional correlations of items that are ordered together. Aggregated transaction data may be used for users who do not yet have adequate transaction data or do not wish for their individual transaction data to be used with the user interface.

In an embodiment, the checkout may also be customized based upon the user identified. For example, the user might always pay by credit card. Under this circumstance, if a user is positively identified and authenticated prior to entering the order, credit card information may already be stored in the system allowing the user to easily select and use that method of payment. The user might also prefer another method of payment and the user interface is customized such that the preferred method of payment is always displayed first (with other methods of payment also available).

Figure 2:
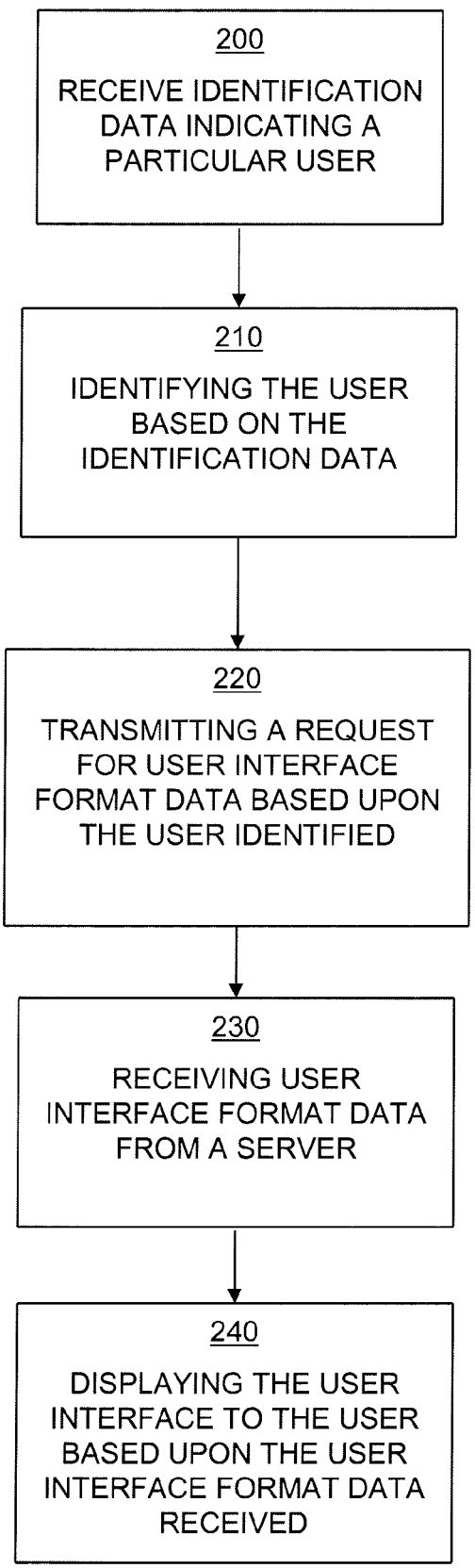
FIG. 2 is an illustration of a workflow for providing personalized touch-based computing devices, according to an embodiment of the invention.

An illustration of the workflow for providing personalized touch-based computing devices is shown in FIG. 2. In step 200 of FIG. 2, a touch-based computing device, such as a kiosk, would receive identification data indicating a particular user. The identification data may be from the user himself through RFID, or NFC, or through other means such as optical recognition. In step 210, the user is identified based upon the identification data. This step may be performed by either a server or the touch-based computing device. The touch-based computing device may store identification data locally and be able to authenticate and identify a particular user. Alternatively, the user identification data may be sent to a server for identification of the user.

In step 220, a request is made by the touch-based computing device to a server for user interface format data based upon the user identified. This request may also be combined with the user identification request, should the user identification request be sent to the server as well. In step 230, the server sends the user interface format data that is then received by the touch-based computing device. Finally, in step 240, the touch-based computing device displays a customized user interface to the user based upon the user interface format data received from the server.

Providing a Personalized User Interface for Employees

In an embodiment, once a user has been identified, the touch-based computing device displays a graphical-user interface for ordering. These changes may be implemented on employee-controlled touch-based computing devices. For example, the user interface for employee-controlled touch-based computing devices might be customized in ways that are similar to those of self-serve touch-based computing devices. The screen might be a mirror-image for left handed employees or items that are frequently pressed on the screen may have their placement changes to increase the speed of entry by the employee. The employee might select any type of formatting changes through a preferences screen. When an employee signs onto a particular terminal, the employee would be identified and the user interface formatting will be customized based on the requests of the employee

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
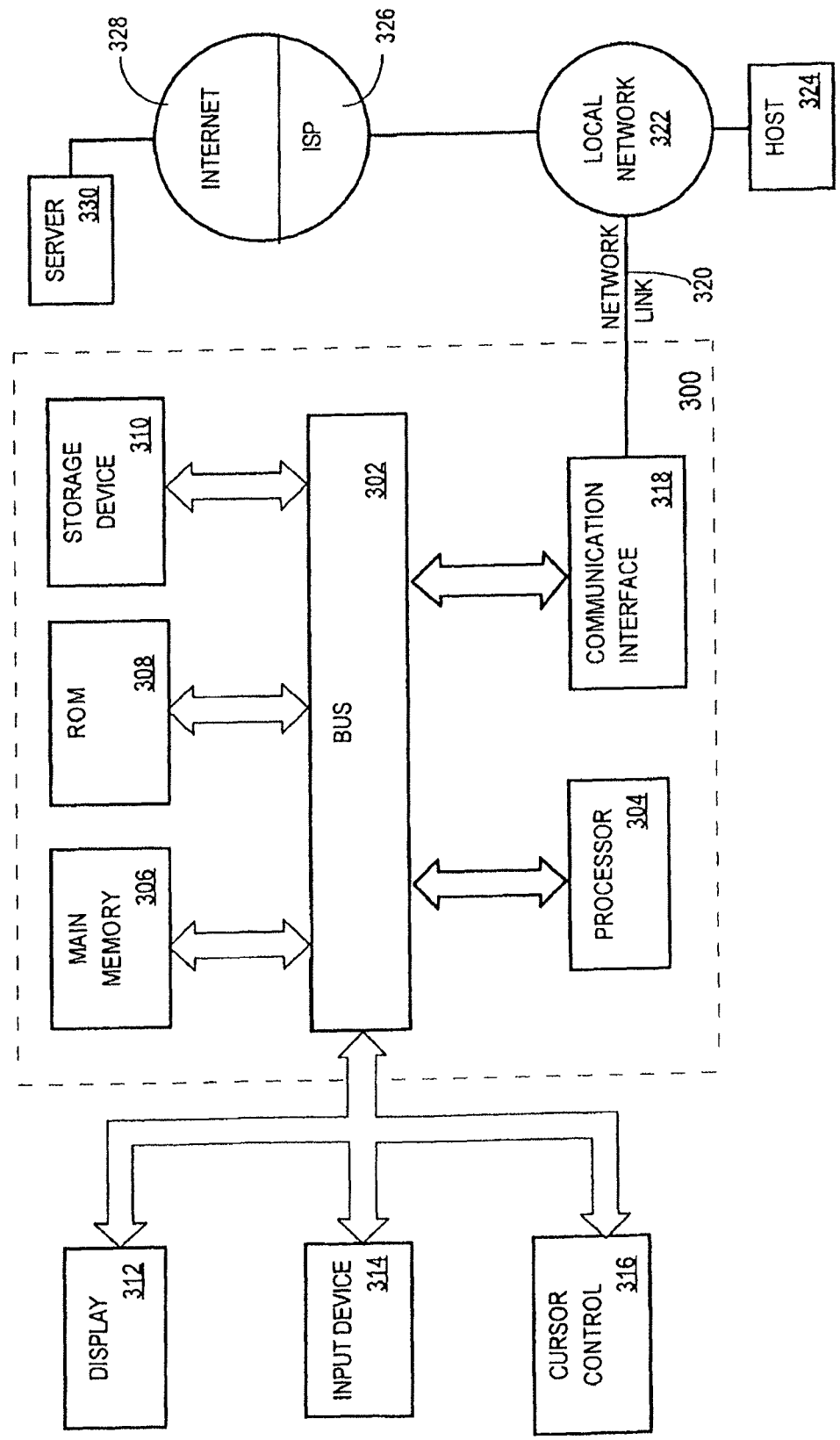
FIG. 3 is a block diagram of a system on which embodiments of the invention may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 310. Volatile media includes dynamic memory, such as main memory 306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method implemented by a server computer, the method comprising:
    personalizing a touch-based graphical user interface displayed on a fixed touch-based self-service kiosk for a user;
    receiving, from the self-service touch-based kiosk a request for user interface format data, the request comprising user identification data;
    identifying a user based upon the user identification data of the request;
    retrieving from a database custom user interface format data for the identified user wherein the retrieved the custom user interface format data includes menu items personalized for the identified user and preferences for graphic information submitted by the identified user;
    transmitting customized user interface format data to the said fixed touch-based kiosk, personalized for the identified user, wherein the customized user interface format data provides layout of a user interface and menu items to be displayed on a user interface on the said fixed self-service touch-based kiosk wherein the menu items to be displayed are ordered to have menu items more frequently purchased by the user appear before other menu items, wherein the font size and font color for the menu items are personalized using the identified user's data, wherein the layout of the user interface is customized to display at least one frequently purchased item in a prominent part of a display screen and to place at least one item correlated to the at least one frequently purchased item on the same display screen wherein the at least one correlated item does not appear on the same non-customized display screen as the at least one frequently purchased item and wherein all items are touch selectable for purchase by the user.

2. The method of claim 1, wherein user interface format data is based upon previous transaction data of the user.

3. The method of claim 2, wherein the menu items to be displayed that are related based upon transaction data are formatted for display together.

4. The method of claim 1, wherein user interface format data is based upon previous transaction data of an aggregate of other users.

5. The method of claim 1, wherein user interface format data is based upon preference selections made by the user.

6. One or more non-transitory storage media storing instructions which, when executed by one or more computing devices, cause performance of the method recited in claim 1.

7. A method implemented by a fixed touch-based kiosk, the method comprising:
    personalizing a graphical user interface for a user;
    receiving identification data that indicates a particular user;
    identifying the user based on the identification data;
    transmitting a request to a server computer for personalized user interface format data based upon the identified user;
    receiving customized user interface format data, based upon the request, that provides layout of the graphical user interface and menu items to be displayed on a user interface personalized for the identified user wherein the menu items to be displayed are ordered to have menu items more frequently purchased by the user displayed before other menu items, wherein the customized user interface format data includes preferences for a graphic user interface submitted by the identified user which includes the font color and the font size used to generate text for each menu item, wherein the layout of the user interface is customized to display at least one frequently purchased item in a prominent part of a display screen and to place at least one item correlated to the at least one frequently purchased item on the same display screen where the at least one correlated item does not appear on the same non-customized display screen as the at least one frequently purchased item and wherein all items are touch selectable for purchase by the user; and
    displaying the graphical user interface based upon the customized user interface format data on the user interface.

8. The method of claim 7, wherein the customized user interface format data is based upon previous transaction data of the user.

9. The method of claim 8, wherein the menu items to be displayed that are related based upon transaction data are displayed together.

10. The method of claim 7, wherein the customized user interface format data is based upon previous transaction data of an aggregate of users not including the particular user.

11. The method of claim 7, wherein customized user interface format data is based upon preference selections made by the user.

12. The method of claim 7, wherein the server computer is a central server that serves all geographic areas.

13. The method of claim 7, wherein the server computer is a regional server that serves a specific geographic area.

14. The method of claim 7, wherein the server computer is local and serves a particular location of a business.

15. One or more non-transitory storage media storing instructions which, when executed by one or more computing devices, cause performance of the method recited in claim 7.

16. A method of personalizing a graphical user interface for a user in a system including a plurality of fixed self-service touch-based kiosks in communication with a server computer where the graphical user interface is displayed on the kiosks, the method comprising:
    receiving, at one of the plurality of self-service touch-based kiosks, identification data that indicates a particular user;

identifying, at the one of the plurality of self-service touch-based kiosks, the user based on the identification data;

transmitting, from at the one of the plurality of self-service touch-based kiosks, a request to the server computer for personalized user interface format data based upon the identified user;

transmitting, by the server computer, user interface format data personalized for the identified user wherein the format data provides layout data for the graphical user interface, menu items to be displayed wherein the menu items to be displayed are ordered to have menu items more frequently purchased by the user displayed before other menu items, preferences for graphic information submitted by the identified user, which includes the font color and the font size used to generate text for each menu item, wherein the layout of the user interface is customized to display at least one frequently purchased item in a prominent part of a display screen and to place at least one item correlated to the at least one frequently purchased item on the same display screen where the at least one correlated item does not appear on the same non-customized display screen as the at least one frequently purchased item and wherein all items are touch selectable for purchase by the user; and displaying, at the one of the plurality of fixed self-service kiosks, the graphical user interface based upon the user interface format data.

17. The method of claim 16, wherein user interface format data is based upon previous transaction data of the user.

18. The method of claim 16, wherein the server computer is a central server computer that serves all geographic areas.

19. The method of claim 16, wherein the server computer is local and serves a particular location of a business.

* * * * *